UNITED STATES PATENT OFFICE.

ANDREAS WILLMANN, OF NEW YORK, N. Y.

IMPROVEMENT IN COMPOSITIONS FORMED OF CAOUTCHOUC.

Specification forming part of Letters Patent No. 27,251, dated February 21, 1860.

*To all whom it may concern:*

Be it known that I, ANDREAS WILLMANN, of the city and county and State of New York, have invented a new and useful Method of Curing India-Rubber or Caoutchouc; and I hereby declare the following to be a full description of the same.

The nature of my invention consists in combining with india-rubber certain anhydrous alkaline salts, to-wit: the anhydrous chlorides and sulphate of alkalies, of which either may be used, or a mixture of two or more of them, provided such mixture will not produce a chemical alteration between their respective constituents, and coke or coal in a finely-divided state. The best result I obtained from the chloride of ammonium, commonly called "sal-ammoniac," and "coke."

In the experiment I made I first ground the rubber between calenders or rollers, as is usually done in the manufacture of india-rubber goods, and then mixed the same with litharge, lamp-black, coke in a finely-divided state, and with from two to ten per cent. of one of the said salts or their mixture, likewise finely divided. The compound was then manufactured into goods in the usual manner and the goods exposed to an artificial heat less than 212° Fahrenheit, or to the heat of the sun, or to sun and air, for several days, when they appeared to be elastic and adhered to the cloth as if cured by any of the processes heretofore known. In the course of my experiments I found that if the said salts or either of them be combined with the india-rubber compounds heretofore patented and used for the manufacture of rubber goods, or with restored waste rubber—that is, such which, after having been cured and become waste and useless by wear and tear or otherwise, is restored by being ground between hot rollers for several hours, or by the processes patented by Ludwig Hela, Francis Barchnagel, and others—the same or a similar result will be obtained—that is, the india-rubber will appear to be fully cured by exposure to heat of less than 212° Fahrenheit, or sun and air, as above stated—and, further, that char or fossil coal may be substituted for coke, although the latter produced a better result.

The quality of said salts and coke to be taken depends upon the ingredients used in connection with them, or either of them. I obtained a good result from mixing one and a-half ounce of chloride of ammonium, commonly called "sal-ammoniac," with two pounds of native rubber, one and a half pound of litharge, one and a half pound of coke, and one-half pound lamp-black, and exposing the goods manufactured from this compound to a heat of 175° to 200° Fahrenheit.

It is to be observed that if too much of said salts is taken the compound is liable to become too soft, and if the compound is exposed to a heat exceeding 212° Fahrenheit it is liable to become stiff and hard.

What I claim now as my invention is—

The combination, with the rubber or its compounds of coke or its equivalent when reduced to a finely-divided state, together with the anhydrous alkaline salts hereinabove mentioned, and whether the latter be used separately or in combination, substantially in the manner and for the purposes set forth.

ANDREAS WILLMANN.

In presence of—
 AARON FRANK,
 WILLIAM W. MEGRONIGLE.